A. H. DE HAAS.
ATTACHMENT FOR ANVILS.
APPLICATION FILED JAN. 28, 1910.
961,109.
Patented June 14, 1910.
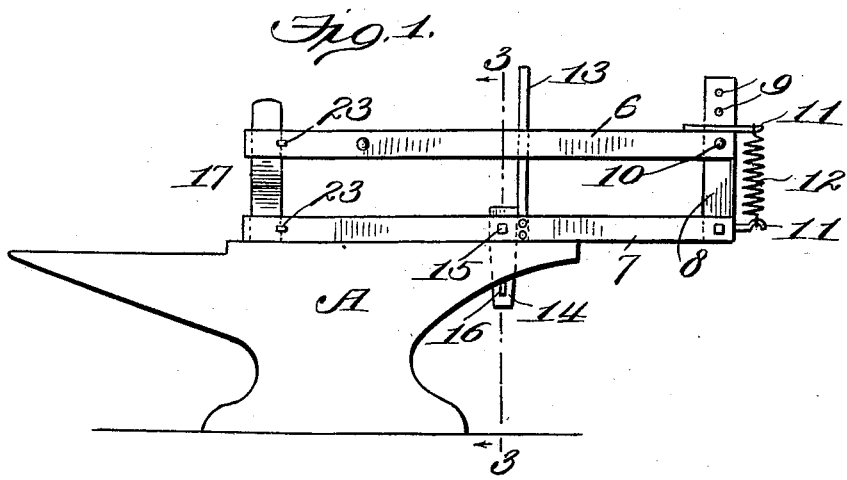
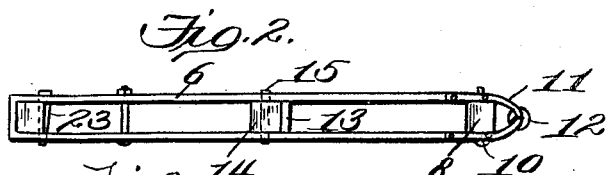
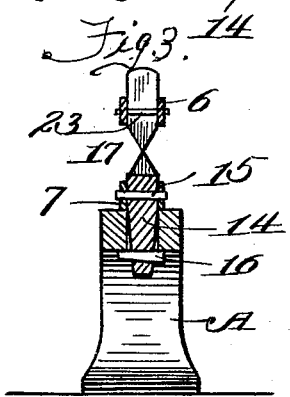
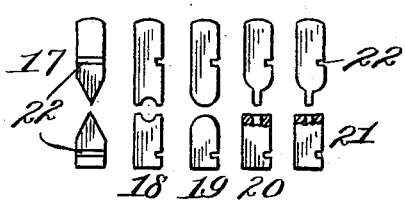
Witnesses:
A. R. Walton
J. A. Barron
Inventor
Abey H. DeHaas
By Milo B. Stevens & Co.
Attys

UNITED STATES PATENT OFFICE.

ABEY H. DE HAAS, OF GOODNIGHT, OKLAHOMA.

ATTACHMENT FOR ANVILS.

961,109.  Specification of Letters Patent.  Patented June 14, 1910.

Application filed January 28, 1910. Serial No. 540,604.

*To all whom it may concern:*

Be it known that I, ABEY H. DE HAAS, a citizen of the United States, residing at Goodnight, in the county of Logan and State of Oklahoma, have invented certain new and useful Improvements in Attachments for Anvils, of which the following is a specification.

My invention relates to an attachment for anvils, my object being to provide a simple and strong device that will hold cutting and punching tools and the like in an operative position whereby to do away with the necessity of a helper in cutting and punching operations and the like.

With this in view, my invention resides in the features to be hereinafter set forth with respect to the accompanying drawing, in which—

Figure 1 is a side elevation of an anvil provided with my improved attachment. Fig. 2 is a plan view of my attachment removed. Fig. 3 is a vertical transverse section therethrough on line 3—3 of Fig. 1, and, Fig. 4 is an elevation of several sets of tools among those which may be used with my attachment.

Referring to these figures, my attachment comprises upper and lower elongated U-shaped frames 6 and 7 connected at their rear open ends by a vertical bar 8, the lower end of which is securely riveted to the end of the lower frame 7 and the upper portion of which has a vertical series of openings 9 any one of which may constitute the fulcrum for vertical swinging movement of upper frame 6, by a pin 10 through openings in the rear end of said frame. The upper frame 6, besides being adapted to swing vertically, is thus adjustable to and from the lower frame 7 at its point of pivot. The two frames 6 and 7 may also have rearward projections 11, connected by a spring 12 whereby to counterbalance the frame 6, which is prevented from sidewise movement and guided in its vertical swinging movement, by a vertical bar 13 upstanding therethrough at a central point, from the lower frame 7 through which the lower end of said bar 13 is rigidly riveted. The lower frame 7 is attachable upon the anvil A, as shown in Fig. 1, by a taper pin 14 which projects downwardly through the usual anvil opening, and has an upper opening by which it is locked through openings in said frame just forwardly of bar 13, with a transverse pin 15, and has a lower opening by which it is locked through the said anvil opening with a transverse pin 16 beneath the heel of the anvil.

The forward ends of the frames 6 and 7 are squared to receive the squared shanks of opposing tools, for instance hot cutters 17, swages 18, fullers 19, round punches 20 and square punches 21, as shown in Fig. 4, the said shanks of said tools having side recesses 22 to receive transverse pins 23 engageable through openings in said frames adjacent their said squared ends, to maintain said tools in position. Of course the shanks of the tools to go into the upper frame are somewhat longer than the others, so as to provide for striking heads.

The operation of my attachment that is the raising of upper frame 6 to insert the work between the tools, and the vertical adjustment of said frame to accommodate different sizes of work will, it is thought, be readily understood.

I claim:

1. An attachment consisting of a pair of superposed frames, means carried by the lower frame to attach the same upon a support, a bar upstanding from one end of the lower frame, relatively engaging means connecting the rear end of the upper frame to said bar for adjustment toward and from the lower frame, and forming a fulcrum for vertical movement of the former, means to guide the upper frame in its swinging movement, and tools and means to support the same in opposing relation in the opposite ends of said frames.

2. An attachment of the character described comprising upper and lower elongated U-shaped frames, a pin locked within the lower frame and depending therefrom, a bar rigidly secured to, and upstanding from one end of said lower frame and having a series of apertures, a member extending through the adjacent end of the upper frame for engagement through a selected opening of said series and forming a fulcrum for said upper bar, said frames having their opposite ends squared and having transverse openings adjacent thereto for the reception of pins, tools having side recesses to be engaged by said pins, and a guide bar projecting vertically from said lower frame through said upper frame to guide the latter in its vertical swinging movement.

In testimony whereof I affix my signature in presence of two witnesses.

ABEY H. DE HAAS.

Witnesses:
J. M. GRAVES,
FRANK M. LEE.